United States Patent
Mamiya et al.

[11] Patent Number: 6,018,744
[45] Date of Patent: Jan. 25, 2000

[54] DATA MANAGEMENT METHOD AND APPARATUS FOR SUCH DATA MANAGEMENT

[75] Inventors: Akira Mamiya, Yokohama; Akira Suga, Tokyo; Hideo Takiguchi, Kawasaki; Takashi Aizawa, Yokohama; Fumiaki Takahashi, Machida; Kenji Hatori, Hatogaya; Koji Hatanaka, Yokohama, all of Japan

[73] Assignee: Canon Kabushiki Kaisha, Tokyo, Japan

[21] Appl. No.: 09/005,827

[22] Filed: Jan. 12, 1998

Related U.S. Application Data

[63] Continuation of application No. 08/357,011, Dec. 16, 1994, abandoned.

[30] Foreign Application Priority Data

Dec. 20, 1993 [JP] Japan .................................. 5-320016

[51] Int. Cl.[7] .................................................. G06F 17/30
[52] U.S. Cl. ............................ 707/104; 707/1; 707/102
[58] Field of Search ................................ 707/1, 10, 200, 707/104, 102, 103

[56] References Cited

U.S. PATENT DOCUMENTS

| | | | |
|---|---|---|---|
| 5,175,854 | 12/1992 | Cheung et al. | 395/670 |
| 5,261,098 | 11/1993 | Katin et al. | 707/1 |
| 5,367,671 | 11/1994 | Feigenbaum et al. | 707/1 |
| 5,421,012 | 8/1987 | Khoyi et al. | 395/677 |
| 5,481,664 | 1/1996 | Hiroya et al. | 345/302 |

OTHER PUBLICATIONS

Abstract of the Japanese Patent, Inventor Akihiko Sato, NEC Corp., Application No. 04-38369, filed Jan. 30, 1992, Abs Grp No. P1651, Abs vol. 17, No. 643, Nov. 1993.

"U–Lead Systems Inc.'s ImagePals version 1.2 Image File Management Utility Program" David Haskin, Computer Shopper, v13, n11, p812(1), Nov. 1993.

"Making Name Spaces Work across Platforms" Jamie Lewis, PC Week, v.10, n9 p52 (1) Mar. 8, 1993.

*Primary Examiner*—Wayne Amsbury
*Assistant Examiner*—Hosain T. Alam
*Attorney, Agent, or Firm*—Fitzpatrick, Cella, Harper & Scinto

[57] ABSTRACT

A method and an apparatus for managing data including images, voice, characters, and the like, in a unified manner. The apparatus has an attribute file or an attribute table for registering therein an attribute peculiar to the data to be registered so that the data attribute can be registered simultaneously with the registration of the data. The data can thus be managed through an application in a unified manner based on the attribute data registered in the attribute file or the attribute table. In order to complete the processing of the application, the attribute data of the attribute file or the attribute table is set to be a mode either of "read-only" or "hidden".

28 Claims, 14 Drawing Sheets

FIG. 4

ATTRIBUTE FILE

| REGISTERED FILE NAME | d : \app \mmdatas \file1 |
|---|---|
| SYSTEM FILE NAME | d : \usr \images \image1 |
| TITLE | TRAVELING |
| KEYWORD | KYOTO |
| OWNER | A |
| PASSWORD | aski103a |
| COLUMN | 480 |
| ROW | 640 |
| DATE | 93/12/1 |
| READ/WRITE ATTRIBUTE | readonly |
| FILE TYPE | tif |
| COMPRESSION | NO |
| RELATED APPLICATION TO FILE | NONE |
| MEMO | d : \app \memo \file1 |
| VOICE | d : \app \audio \file1 |
| BINARY IMAGE | d : \app \nichi \file1 |
| THUMBNAIL | d : \app \thumb \file1 |
| SOURCE | camera |
| SHUTTER SPEED | 1/250 |
| IRIS | 8 |
| FLASH | OFF |
| REGISTERED FILE NAME | d : \app \memo \file1 |
| ⋮ | ⋮ |

INDEX FILE

| | | |
|---|---|---|
| 8 | file1 | 501 |
| 480 | file1,file2 | |
| 640 | file1,file2 | |
| 1240 | file3 | |
| 1280 | file3 | |
| 1/250 | file1 | |
| 1/500 | file3 | |
| 93/12/1 | file1 | |
| 93/12/12 | file3 | |
| A | file1 | |
| bmp | file2 | |
| camera | file1 | |
| readonly | file1 | |
| tif | file1 | |
| SPORT DAY | file5 | |
| KYOTO | file1 | |
| TOKYO | file3,file4 | |
| NONE | file1 | |
| TRAVELING | file1,file3,file4 | |
| ⋮ | ⋮ | |

FIG. 10(a)

TAG-TYPE ATTRIBUTE FILE

| | | 1001 |
|---|---|---|
| T1 | d : \app \mmdatas \file1 | |
| T2 | d : \usr \images \image1 | |
| T3 | TRAVELING | |
| T4 | KYOTO | |
| T5 | A | |
| T6 | aski103a | |
| T7 | 480 | |
| T8 | 640 | |
| T9 | 93/12/1 | |
| T10 | readonly | |
| T11 | tif | |
| T12 | NONE | |
| T13 | NONE | |
| T14 | d : \app \memo \file1 | |
| T15 | d : \app \audio \file1 | |
| T16 | d : \app \nichi \file1 | |
| T17 | d : \app \thumb \file1 | |
| T18 | camera | |
| T19 | 1/250 | |
| T20 | 8 | |
| T21 | OFF | |
| EOM | | |
| T1 | d : \app \mmdatas \file2 | |
| T2 | d : \usr \images \image1 | |
| T7 | 480 | |
| T8 | 640 | |
| T9 | 93/12/1 | |
| T11 | tif | |
| ⋮ | ⋮ | |

FIG. 10(c)

DEFAULT TAG MAP FILE 1003

| T1 | SYSTEM FILE NAME |
|---|---|
| T2 | SYSTEM FILE NAME |
| T3 | SYSTEM FILE NAME |
| T9 | SYSTEM FILE DATA |
| T10 | readonly |
| T11 | EXTENSION OF SYSTEM FILE NEME |

FIG. 10(b)

TAG MAP FILE 1002

| T1 | REGISTERED FILE NAME |
|---|---|
| T2 | SYSTEM FILE NAME |
| T3 | TITLE |
| T4 | KEYWORD |
| T5 | OWNER |
| T6 | PASSWORD |
| T7 | COLUMN |
| T8 | ROW |
| T9 | DATE |
| T10 | READ/WRITE ATTRIBUTE |
| T11 | FILE TYPE |
| T12 | COMPRESSION |
| T13 | RELATED APPLICATION TO FILE |
| T14 | MEMO |
| T15 | VOICE |
| T16 | BINARY IMAGE |
| T17 | THUMBNAIL |
| T18 | SOURCE |
| T19 | SHUTTER SPEED |
| T20 | IRIS |
| T21 | FLASH |
| ... | ... |
| Tn | |

ATTRIBUTE INPUT AND TAG VALUE EXTRACTION

MOVE TO S1104 IN FIG. 12

DATA MANAGEMENT METHOD AND APPARATUS FOR SUCH DATA MANAGEMENT

This application is a continuation of application Ser. No. 08/357,011, filed Dec. 16, 1994, now abandoned.

BACKGROUND OF THE INVENTION

1. Field of the Invention

The present invention relates to a data management method and a data management apparatus for databases and files which deal with image, voice and various data.

2. Description of the Related Art

Conventionally, personal computers and work stations manage various types of files represented by databases on an OS (operating system). An application running on the OS is operated as a file on the OS. When an application, such as a database, is operated using a file on the OS, and the application is ended, the file manipulation through the OS is performed using commands provided for the OS. This can cause a command error, which may give rise to the accidental erasing of the file from the OS.

Also, all items of data are integrated into a single data file in the database system, and there are many cases in which various types of accesses, such as data registration, erasing, and the like, can only be made through the database. Such a system in which all items of data are integrated into a single file presents the following problems. In particular, the handling of images, voice, and other information, apart from the text data, makes the amount of data massive, which is thus difficult to handle, thereby resulting in a slowdown in the speeds of retrieval and of other types of processing.

Conventionally, an archive of the type in which a plurality of files are unified or an archive of the type in which files are compressed are available for software for personal computers and work stations. For example, TAR is available for the well-known UNIX (a trademark of UNIX System Laboratories, Inc.). TAR, which is referred to as a tape archive, is largely formed on a tape as a sequentially-accessed auxiliary storage device in such a way that a plurality of items of data are integrated into a single file. TAR can be formed not only on a tape, but also in a file on a hard disk. The archive of this type, which is in the form of a single file, cannot be directly accessed from an application, but requires the procedure of unarchiving and extracting by the user for use.

Further, in the data management apparatus of the foregoing related art, if the file management is commonly performed for the applications and the OS, the files may be accidentally erased by the OS commands through the OS.

Also, most applications, such as databases, are so constructed that all items of data are contained in a single file. Hence, the handling of large-capacity data, such as images and voice, makes the data massive, which is thus difficult to handle.

Moreover, data conversion is required when an item of data which has once been registered is manipulated through the OS other than through the application in which such registration had been performed, thus increasing the burden on the user.

SUMMARY OF THE INVENTION

Accordingly, an object of the present invention is to provide a database management system or a file management system, free from conflict between the management of an application and that of an OS.

Another object of the present invention is to provide a data management method employed whereby the original file on the OS can easily be restored, and also to provide a data management apparatus using such a method.

In order to achieve the above objects, the present invention provides a data management apparatus for managing data including images, voice, characters, and the like, in a unified manner, the apparatus comprising: data registration means provided with an attribute file or an attribute table for registering therein an attribute peculiar to data to be registered, thereby registering the data attribute in the attribute file or the attribute table, simultaneously with registration of the data; data processing and management means for processing and managing the data in an application in a unified manner based on the attribute data registered in the attribute file or the attribute table; and attribute setting means for setting the attribute data to be "read-only" or "hidden" before the processing of the application is ended.

The present invention also provides a data management apparatus for managing data including images, voice, characters, and the like, in a unified manner, the apparatus comprising: data registration means provided with an attribute file or an attribute table for registering therein an attribute peculiar to data to be registered, thereby registering the data attribute in the attribute file or the attribute table, simultaneously with the registration of the data; data processing and management means for processing and managing the data through an application in a unified manner based on the attribute data registered in the attribute file or the attribute table; data erase means for deleting the data by use of the attribute file or the attribute table and shifting the data to the state under the management of an operating system for the file management apparatus; and attribute setting means for setting the attribute data to be "read-only" or "hidden" before the processing of the application is ended.

The present invention further provides a data management apparatus for managing data, comprising an attribute file or an attribute table for recording an attribute peculiar to a database or a file and a path indicating where the file is registered, thereby managing the database and various files through a certain application in a unified manner. The apparatus also sets the file managed by the application to be into a mode in which the file can be accessed only by such an application, thereby protecting it from being accessed by other applications. Further, the following system is realized for the data management apparatus. In order to delete the registered data, such a system refers to a path registered in the attribute file or the attribute table so as to restore the data into the file on the operating system (OS). As a result, the data management apparatus can protect the data from being erroneously erased by the OS and applications other than a particular application.

Further objects, features and advantages of the present invention will become apparent from the following description of the preferred embodiments with reference to the attached drawings.

BRIEF DESCRIPTION OF THE DRAWINGS

FIG. 4 illustrates the construction of an attribute file;

FIG. 5 illustrates the construction of an index file;

FIG. 10(a) illustrates the construction of a tagged attribute file of an attribute file system according to a second embodiment of the present invention;

FIG. 10(b) illustrates the construction of a tagged map file of the attribute file system;

FIG. 10(c) illustrates a default tagged map file of the attribute file system;

DETAILED DESCRIPTION OF THE PREFERRED EMBODIMENTS

A data management apparatus of the present invention will now be described in detail with reference to the drawings.

Figure 1:
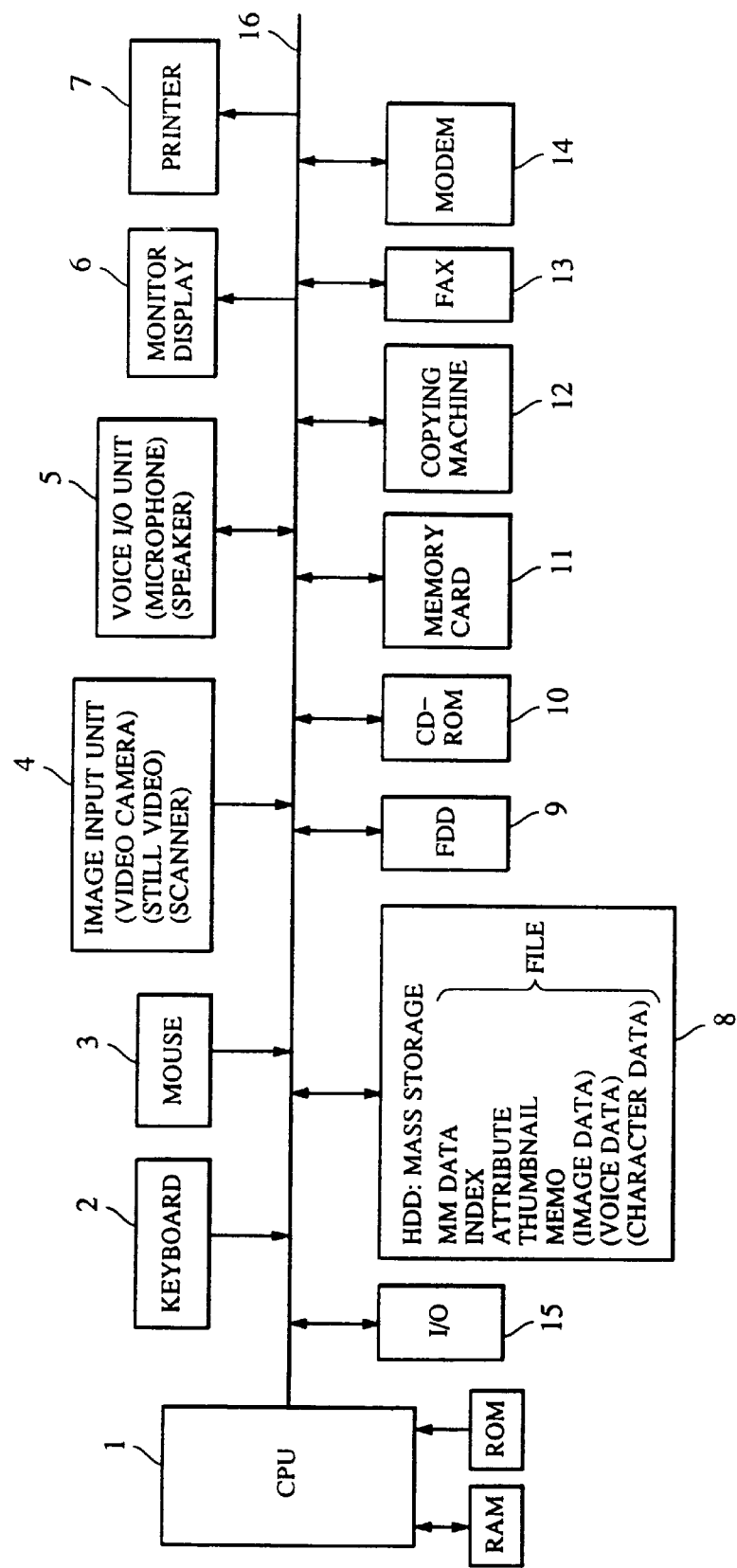
FIG. 1 is a block diagram illustrative of the construction of hardware in common use for respective embodiments of a data management apparatus of the present invention.

FIG. 1 is a block diagram illustrative of the construction of hardware in common use for respective embodiments of a data management apparatus of the present invention.

Referring to FIG. 1, the hardware for the data management apparatus comprises: a central processing unit (CPU) 1 for managing the entire system; a keyboard 2; an input unit 3, such as a mouse through which various manipulations are performed while observing information displayed on a below-mentioned monitor display screen; an image input unit 4 for inputting image data through a video camera, or the like; a voice input/output unit 5 provided with a microphone, a speaker, or the like, so as to input and output a voice signal; a monitor display 6 for displaying various images, character data, and the like; a printer 7; and a hard disk drive (HDD) used as an external storage device which constitutes a main storage device.

The hardware further comprises: a floppy disk drive 9, a CD-ROM device 10, a memory card 11, which components are all used as external storage devices; multimedia equipment, such as a copying machine 12, a facsimile 13 and a modem 14; and an interface I/O 15 for interfacing between the CPU 1 and various peripheral equipment.

The foregoing components are connected to each other via a bus line so as to send and receive various data and control signals under CPU control, thereby executing various types of control and processing.

Within the HDD 8 used as a main storage device, various databases, data files, program files, information tables, including image data and voice data, are formed. The major files according to this preferred embodiment are an image data file, a voice data file, a multimedia data file, an attribute file, an index file, a memo file, and various other files.

Figure 2:
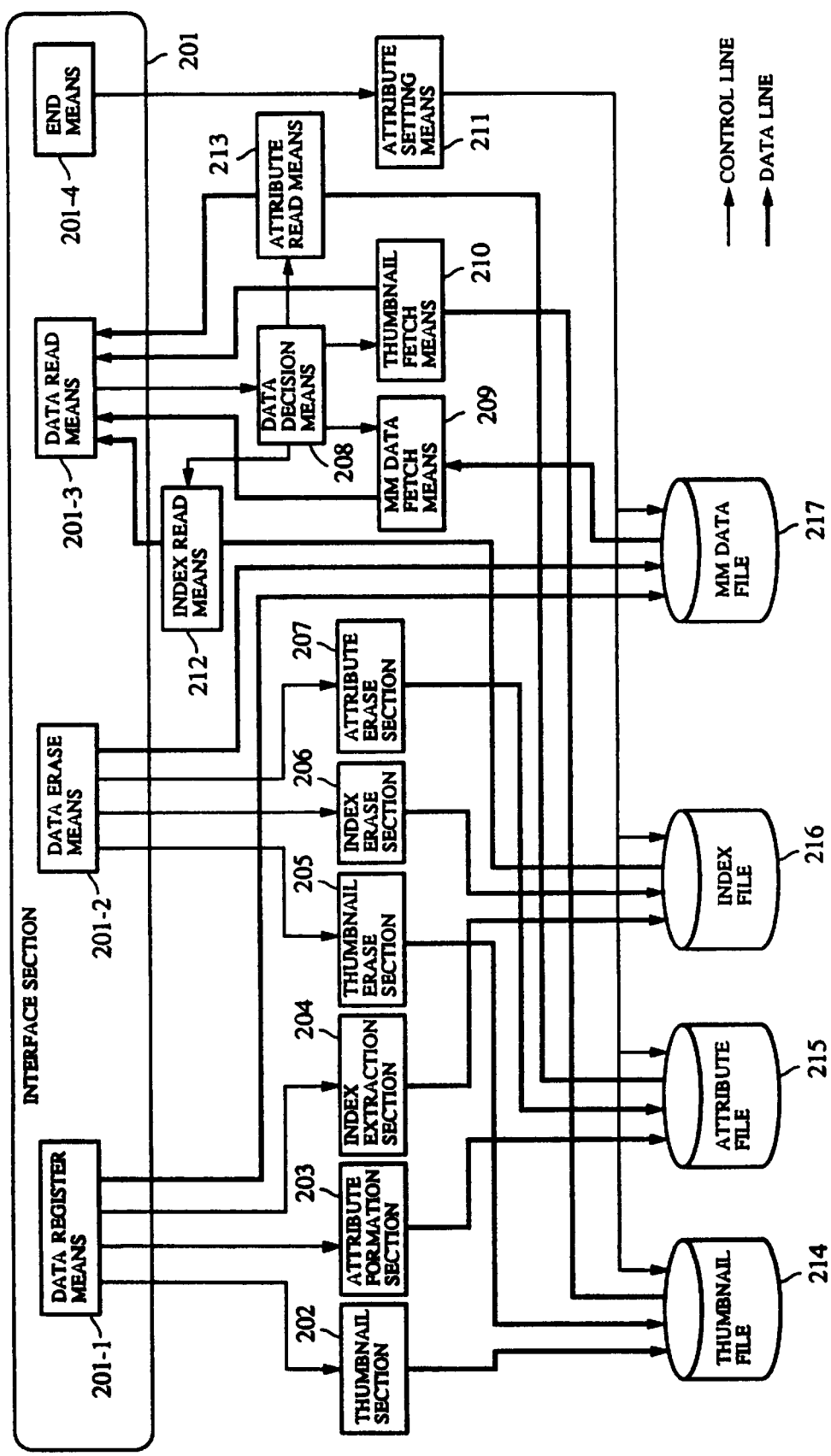
FIG. 2 is a block diagram illustrative of the construction of the data management and the processing system of a data management apparatus according to a first embodiment of the present invention.

FIG. 2 is a system block diagram illustrative of the data management and the processing system of the data management apparatus according to a first embodiment of the present invention. The data management apparatus comprises: an interface section 201 for processing various data; a thumbnailing section 202 for forming reduced images and symbol images; an attribute formation section 203 for forming an attribute peculiar to a data file, or the like; an index extraction section 204 for extracting an index from attribute data, or the like; a thumbnail erase section 205 for erasing a thumbnail; an index erase section 206 for erasing an index; an attribute erase section 207 for erasing attribute data; a data decision section 208 for selecting and deciding an item of data to be accessed; a MM (multimedia) data fetch section 209 for fetching MM data; a thumbnail fetch section 210 for fetching a thumbnail from a thumbnail file 214; an attribute setting section 211 for setting an attribute for the related various data and file; an index read section 212 for reading an index from the index file 216; and an attribute read section 213 for reading attribute data from an attribute file 215.

The data management apparatus also comprises a thumbnail file 214, an attribute file 215, an index file 216 and a MM data file 217.

The interface section 201 further comprises a data register section 210-1, a data erase section 201-2, a data read section 201-3 and a data end section 201-4. As is seen from FIG. 2, thick lines indicate data lines through which data exchanges are made, while thin lines indicate control lines through which file controls are executed. The system of this embodiment is adapted to be constructed on an OS (operating system). An explanation will be given on the assumption that the system runs on a general purpose personal computer, for example, an MS-DOS (registered trademark of Microsoft company).

Figure 3:
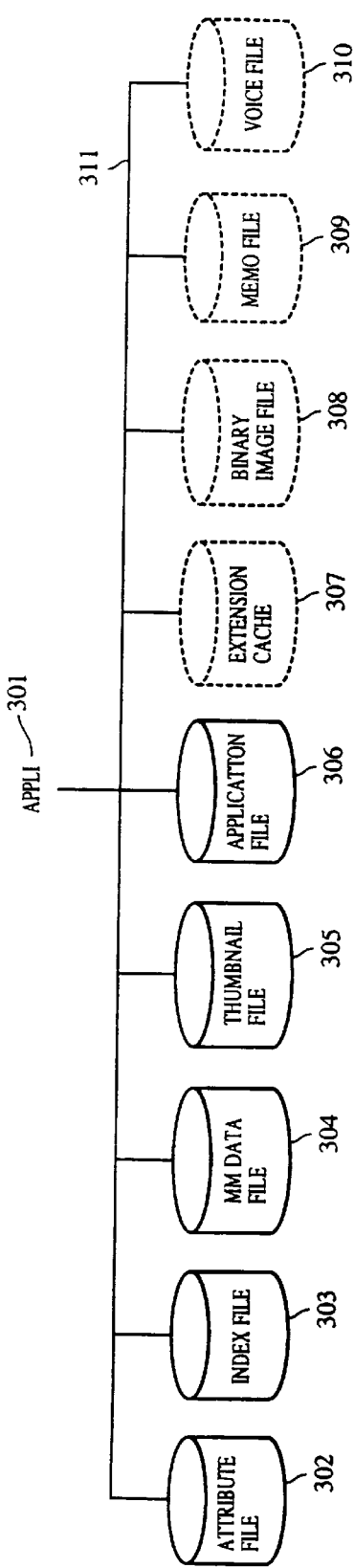
FIG. 3 is a system block diagram illustrative of the file construction of the present invention.

FIG. 3 illustrates the file construction of the present invention. The "appli" 301 indicates a home (top level) of a directory for operating this system and comprises an attribute file 302, an index file 303, a MM data file 304, a thumbnail file 305, an application file 306, an extension cache 307, a binary image file 308, a memo file 309, and a voice file 310, which components are all formed under the home through a tree 311.

The file construction discussed above is expressed logically; to put it more specifically, it is explained in the form viewed from an application. The attribute file 302 is formed of a single file, and a description thereof will be given below. The index file 303 may be formed of one or a plurality of files, and an example of the index file formed of a single file will be given below. The MM data file 305 may be in such a form that all items of data are contained in one file or that each item of data is contained in each file. The application file 306 is used as a space for storing the application of the present invention. The extension cache 307 is formed of a single file and is constructed as required. The binary image file 308, the memo file 309 and the voice file 310 are each formed of a single file and are constructed as required.

The extension cache 307, the binary image file 308, the memo file 309 and the voice file 310, which are all indicated by broken lines, are not initially present but may be constructed as required. The extension cache 307 is used to extend the compressed MM data and temporarily store it therein, and such an extension cache 307 is erased when completing this system.

FIG. 4 illustrates the construction of an attribute file 401; and more specifically, it illustrates the internal construction of the attribute file 302 shown in FIG. 3. Items introduced into the attribute file 302 are: registered file name, system file name, title, keyword, owner, password, column, row, date, read/write attribute, file type, compression, the related application to the file, memo, voice (audio), binary image, thumbnail, source, shutter speed, iris and flash.

"The registered file name" is used for this data management system and is stored based on the absolute path. The registered file name is generally input by the user, but if there is no indication of inputting, the system file name is automatically selected as a default. "The system file name" is stored in order to know from where the data is transferred, and is stored based on the absolute path in the construction of the directory of the OS.

"The title" is input by the user, and if there is no indication of inputting, the registered file name (excluding the directory) of is automatically selected as a default. Also, if the registered file name coincides with the system file name, the system file name is automatically selected as the title.

"The keyword", which is input by the user, can be used for executing retrieval processing, or the like, and may be just a single word. "The owner", which is also input by the user, is not essential for executing various processing and can thus be omitted. "The password", which is also input by the user, is not essential for executing various types of processing and can thus be omitted. The possible password is encrypted in any suitable manner, known in the art. "The column and row" indicate information concerning the image size. Unless otherwise specified, the date in the system is stored in the item of "the date".

"The read/write attribute" is generally set to be read-only in order to protect it from being destroyed by the access of another application or the OS. In the processing of the MM data deletion, the read/write attribute is set to be read/write, that is, readable and writable.

"The file type" indicates an extension in the OS, for example, "tif", "bmp" and "avi", the number of characters allowed on the MS-DOS being up to three. If the MM data file has been compressed, "YES" is stored in the item of "the compression"; conversely, if the MM data file has not been compressed, "NO" is stored therein. An application related to the file is used for starting the MM data together with the file. If there is any such application, the name thereof is stored in "the related application", and if not, "NONE" is stored therein.

The directory and the file name of the data are stored in the applicable items of "the memo", "the voice (audio)" and "the binary image" based on the absolute path. If such data is not applicable for such items, "None" is stored therein. The directory and the file name of the data is stored in the item of "the thumbnail" based on the absolute path. It should be noted that data is always stored in "the thumbnail" without exception.

The source indicates the name of the origin for creating the MM data, that is, the data, such as camera, video camera, still video camera, scanner, or the like. For example, if the data source is camera, "the shutter speed", "the iris" and "the flash" are provided for the data. Applicable numbers are stored in "the shutter speed" and "the iris", and either "ON" or "OFF" is stored in "the flash". Similarly, attributes of a plurality of items of data, such as the second MM data, the third MM data, and the following MM data, are sequentially stored.

FIG. 5 illustrates the construction of an index file 501 which shows the file names by each index of various indexes extracted from the attribute file 401 by the index extraction section 204.

Figure 6:
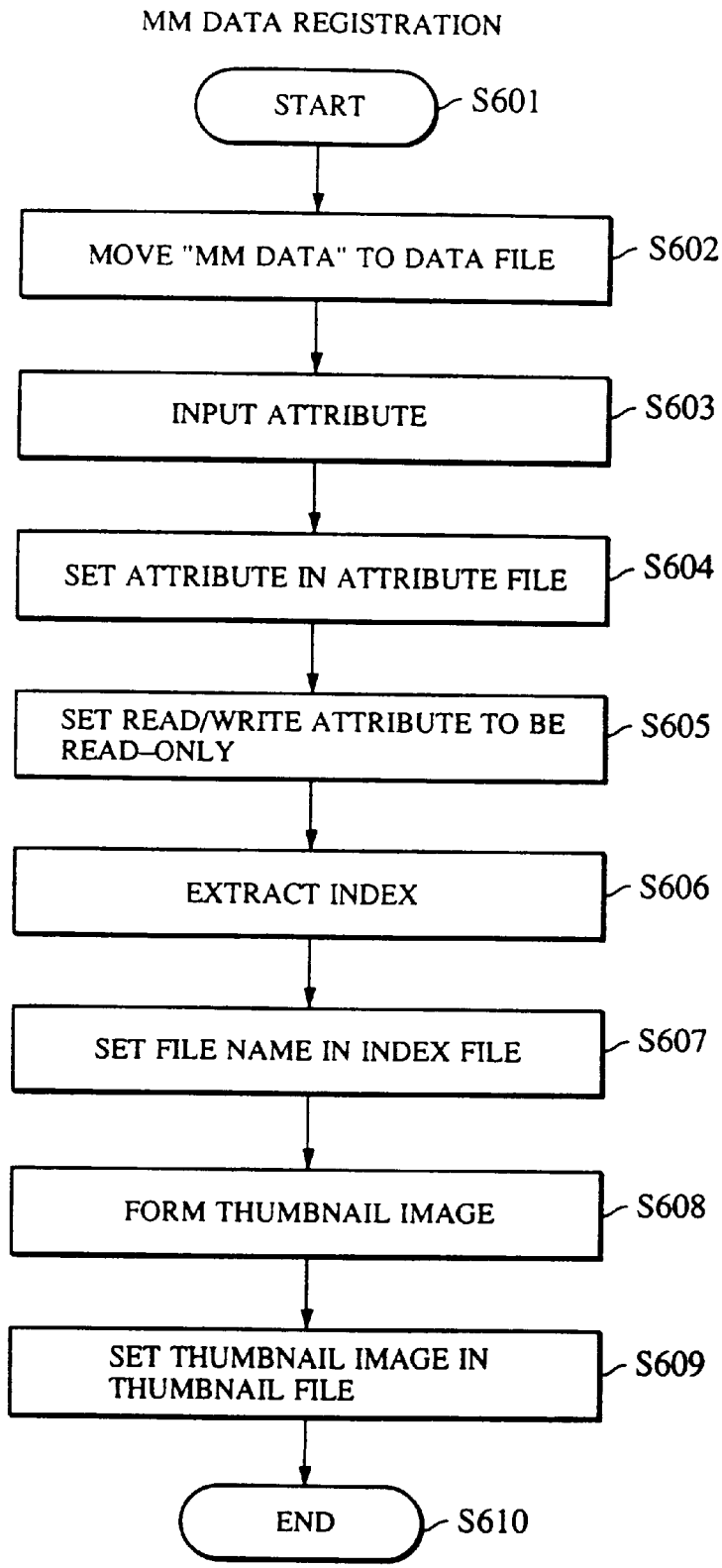
FIG. 6 is a flow chart illustrative of the processing for the data registration.

FIG. 6 is a flow chart illustrative of the MM data registration. The flow starts in step S601. "MM data" is moved to the MM data file in S602, in which case "MM data" may be copied, and then the original data may be erased.

The flow proceeds to the attribute input in S603 in which the attribute data peculiar to the data file is input by the user manipulation. The input attribute data is stored in the memory until the user manipulation is completed. In S604, such attribute data is set in the attribute file upon completion of the user manipulation.

Then, the read/write attribute peculiar to the registered MM data file is set to be read-only (S605), which is for safety, protecting the file from being accidentally erased by another application or the OS.

Subsequently, an index is extracted from the attribute file 401 by the index extraction section 204, and the file name is decided (S606). Such a file name is temporarily stored in the memory and is then set in the index file (S607).

A thumbnail image is formed by the thumbnailing section 202 (S608), and the resultant thumbnail image is set in the thumbnail file (S609). The processing for MM data registration is thus ended (S610).

Figure 7:
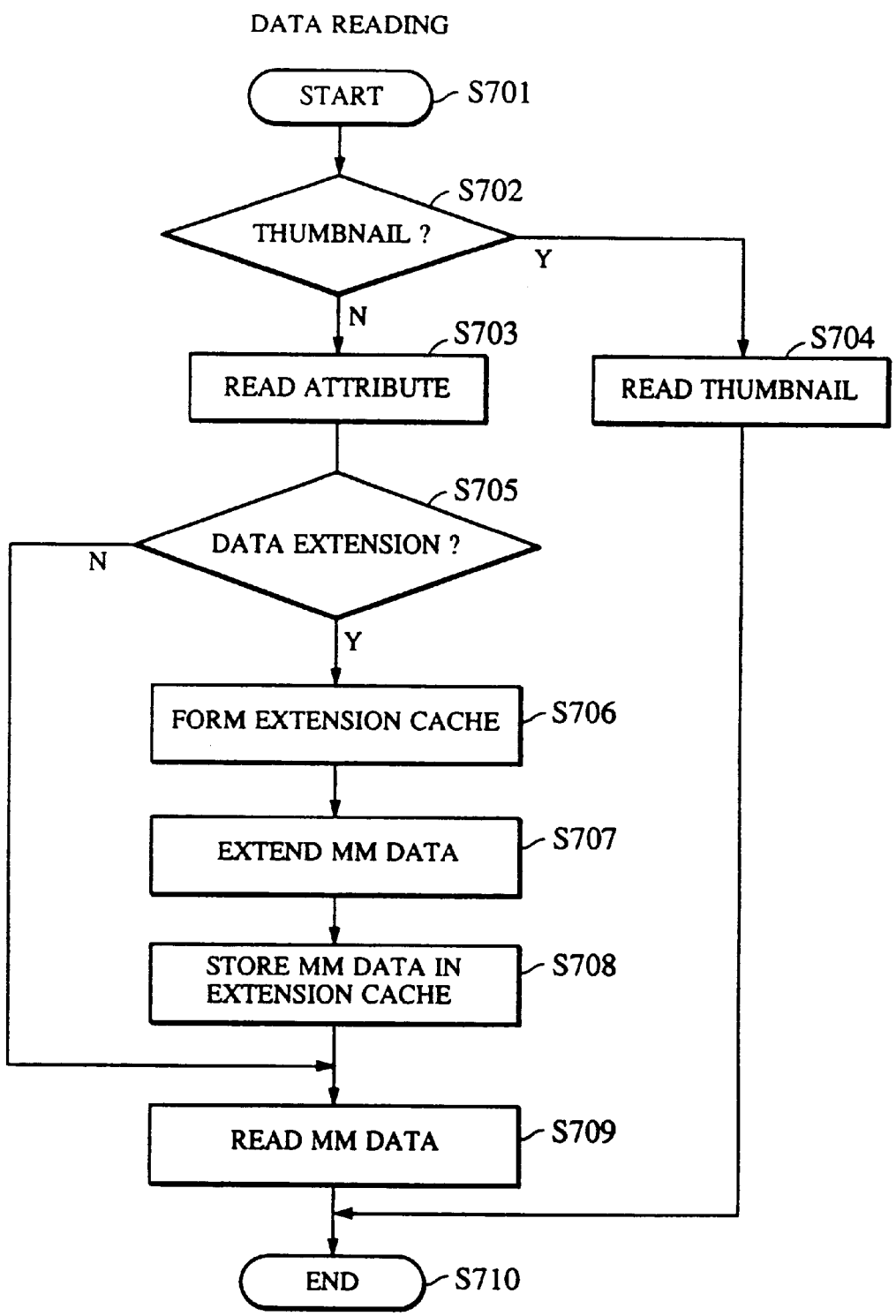
FIG. 7 is a flow chart illustrative of the processing for the data reading.

FIG. 7 is a flow chart illustrative of the data reading. The flow starts in step S701. The data decision section 208 makes a comparison and a decision whether the data to be read is a thumbnail image according to a message from the data read section 201-3.

If the answer in S702 is YES, such a thumbnail image is read from the thumbnail file 214 by the thumbnail fetch section 210, and the thumbnail data is transmitted to the data read section 201-3 (S704). If the answer in S702 is NO, the attribute in the designated MM data file is read from the attribute file 215 by the attribute read section 213 (S703). Then, it is determined whether the MM data file has been compressed and is thus required to be extended (S705). If the answer in S705 is YES, the flow proceeds to S706, and, if the answer is NO, the flow proceeds to S709.

In S706, the extension cache 307 is formed by the MM data fetch section 209. Then, the MM data is fetched by the MM data fetch section 209 and is extended (S707), and the extended MM data is stored in the extension cache 307 (S708).

Subsequently, such extended MM data is read from the extension cache 307 by the MM data fetch section 209 and is transmitted to the data read section 201-3 (S709). If the answer in S705 is NO, the MM data is directly transmitted to the data read section 201-3 from the MM data file 304 (S709). The processing for data reading is thus ended (S710).

Figure 8:
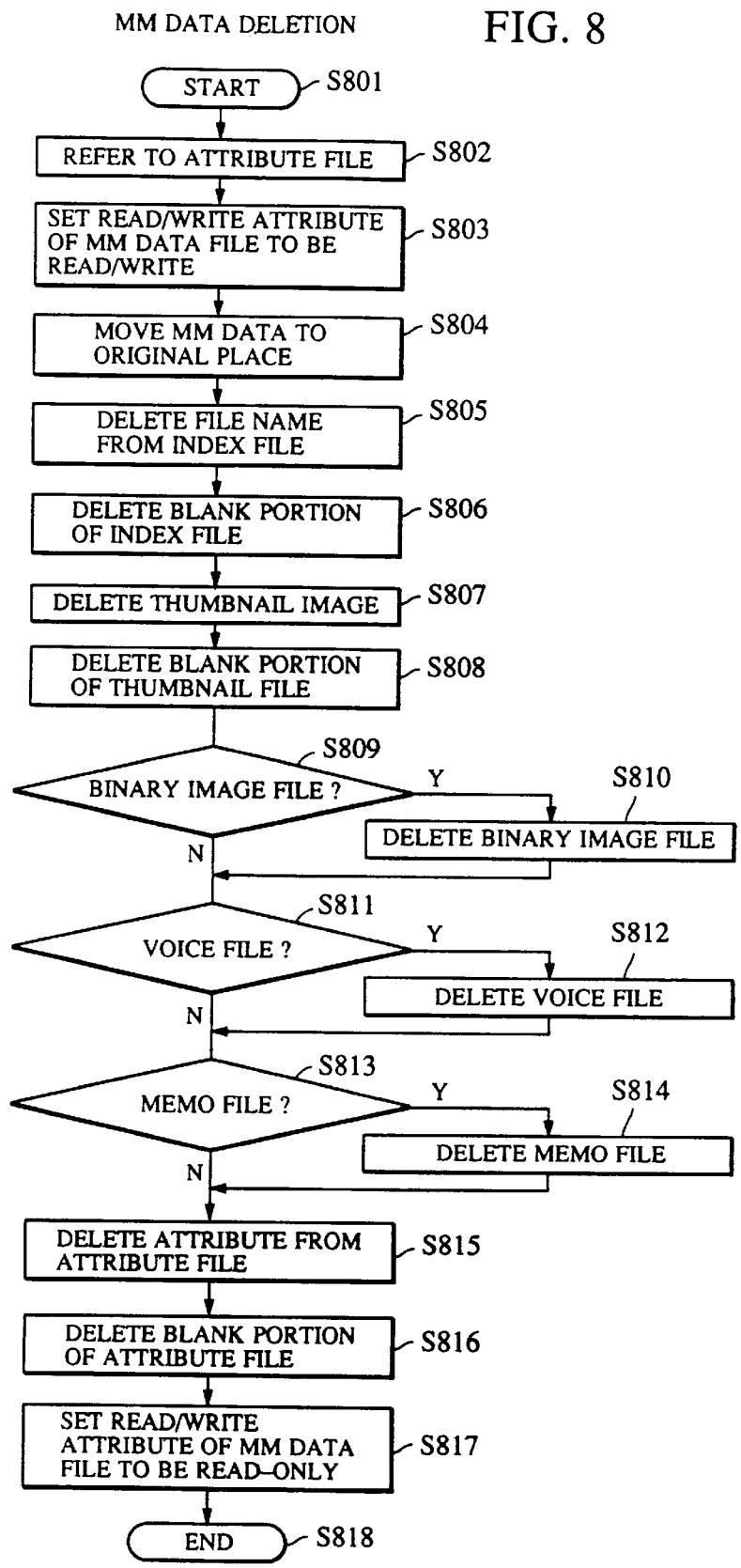
FIG. 8 is a flow chart illustrative of the processing for the MM (multimedia) data deletion.

FIG. 8 is a flow chart illustrative of the processing of the data deletion. The flow starts in step S801. A reference is made to the attribute file 215 (S802), and the read/write attribute peculiar to the MM data is set to be read/write (readable and writable) in S803 so that the MM data file can be read and written. Then, the MM data is returned to the original place (the directory and the file name in the OS before processing the data registration) in S804. Alternatively, the MM data may be copied, and then, the registered file may be deleted. Thus, the targeted MM data is deleted on the currently-used application and can be accessed by the OS or another application.

The file name corresponding to the index of the targeted data is deleted from the index file 501 (S805), and a blank in the index file 501 resulting from the deletion of such a file name is deleted (S806).

Subsequently, the designated thumbnail image(s) of the file name is/are deleted (S807). When a plurality of thumbnail images are contained in a single file, a blank of the file resulting from the deletion of the thumbnail image is deleted in the order of a higher address, thereby minimizing the data capacity (S808).

It is then determined by referring to the attribute file 215 whether a binary image is contained in the targeted data (S809). If the answer in S809 is YES, the flow proceeds to S810 in which the designated binary image is deleted. On the other hand, if the answer is NO, the flow proceeds to S811 in which it is determined by referring to the attribute file 215 whether a voice (audio) file is contained in the data to be deleted. If the answer in S811 is YES, the flow proceeds to S812 in which the designated voice (audio) file is deleted. On the other hand, if the answer is NO, the flow proceeds to S813 in which it is determined by referring to the attribute file 215 whether a memo file is contained in the data to be deleted. If the answer in S813 is YES, the flow proceeds to S814 in which the designated memo file is deleted. Conversely, if the answer is NO, the flow proceeds to S815 in which an attribute is deleted from the attribute file 215 by the attribute erase section 207 (S815). A blank of the attribute file 215 is deleted (S816). Then, the read/write attribute peculiar to the MM data is set to be read-only so that it can be protected from being erased by the access of the OS and another application (S817). The processing of the MM data deletion is thus ended (S818).

Figure 9:
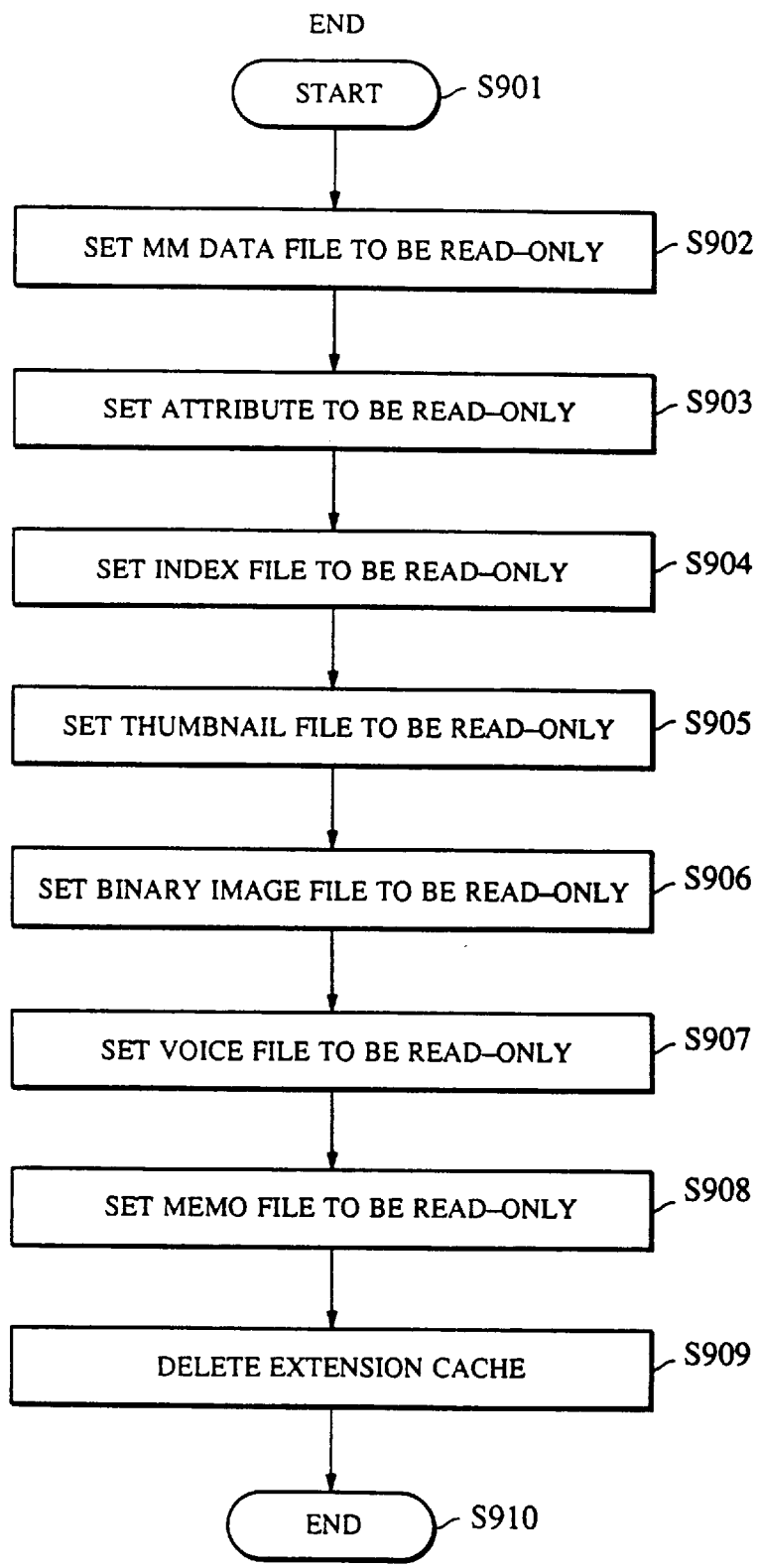
FIG. 9 is a flow chart illustrative of the processing for ending an application.

FIG. 9 is a flow chart illustrative of the processing of ending of this application. The flow starts in S901. The MM data file is set to be read-only so that it can be protected from being erased by the access of the OS or another application (S902). The read/write attribute peculiar to the attribute file is also set to be read-only for the same reason (S903).

Likewise, the read/write attributes peculiar to the index file, the thumbnail file, the binary image file, the voice (audio) file and the memo file are all set to be read-only (S904–S908). The extension cache 307 is deleted (S909). The processing for ending the application is thus completed (S910).

As will be understood from the foregoing description, the first embodiment offers the following advantages.

The first embodiment thus employs the attribute file and executes the processing of the attribute data in the attribute file, thereby enabling efficient and speedy performance of various types of processing of the MM data by suitable use of the data register section, the data read section and the data erase section. Further, in particular, there is no danger of accidentally erasing data through the OS, thereby realizing the data file management and the management processing system with extreme efficiency.

A second embodiment of the present invention is shown in FIG. 10. This embodiment is shown in the form of a tagged attribute file system. The attribute file system is constructed of a tagged attribute file, a tagged map file and a default tagged map file indicated in FIGS. 10(a), 10(b) and 10(c), respectively.

FIG. 10(a), as well as FIG. 4, illustrates an attribute file 1001 for storing attributes, and only necessary items in the form of tags are stored in the attribute file 1101. Then, a reference is made to a tagged map file 1002 shown in FIG. 10(b) in order to understand the meanings of the tags provided for the attribute file 1001.

The number of tags can be increased by the user depending on the type of data attributes. It is set up to T21 in this embodiment, but can be increased up to Tn. The minimum items required for registering the MM data have been written into the default tagged map file shown in FIG. 10(c). When the tags and parameters are not input by the user, a reference is made to this map file so that they can be written into the attribute file.

Referring to the content of the default tagged map file 1003, T1, T2 and T3 indicate the respective system file names; T9 designates the system date; T10 shows the mode of read-only; and T11 indicates the extension of the system file name.

Figure 11:
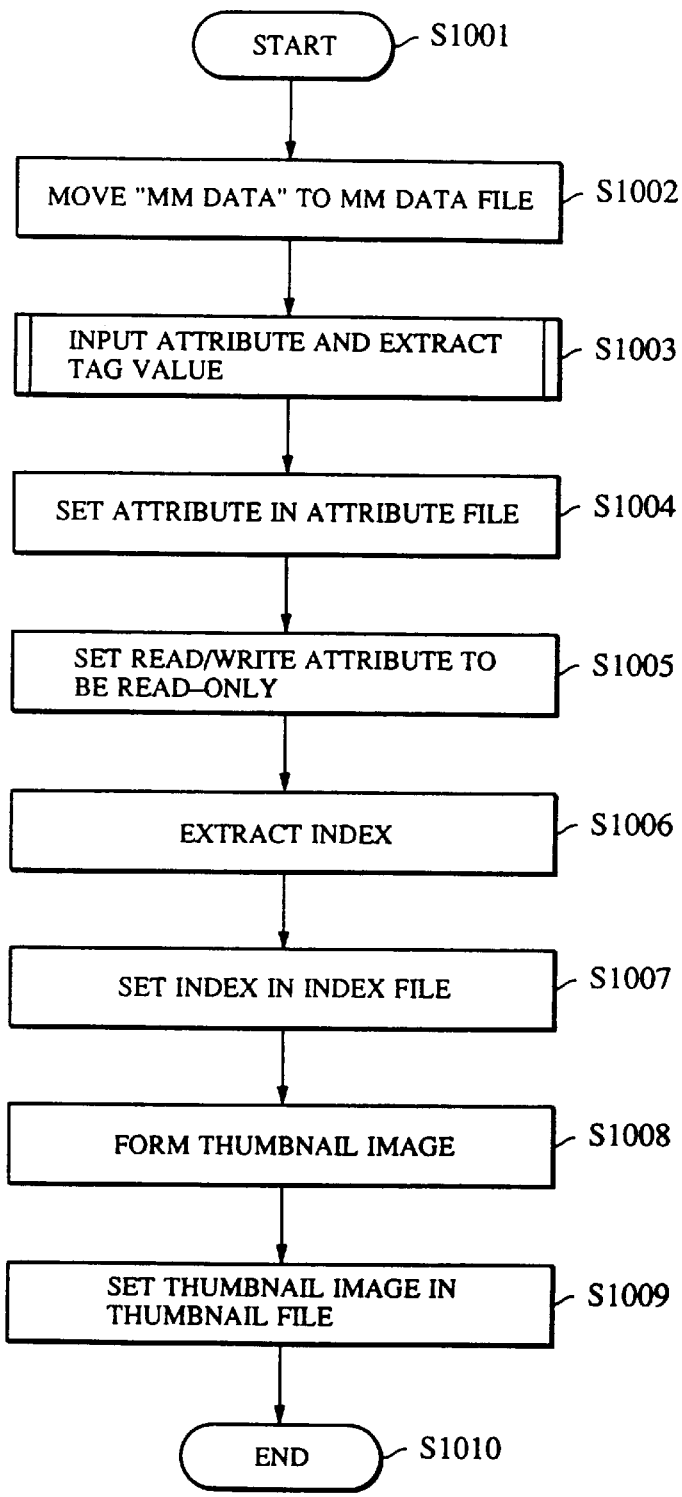
FIG. 11 is a flow chart illustrative of the MM data registration according to a second embodiment of the present invention.

FIG. 11 is a flow chart illustrative of the MM data registration using the tagged attribute file system. The flow starts in S1001, and "MM data" is moved to the MM data file (51002).

Subsequently, an attribute is input and the tag value is extracted (S1003). This processing is operable as a subroutine, the content of which is indicated by a flow chart of FIG. 12.

A subsequently-extracted attribute is set in the attribute file 215 (S1004), and the read/write attribute peculiar to the registered MM data file is set to be read-only (S1005). An index is then extracted by the index extraction section 204 (S1006), and the extracted index is set in the index file 216 (S1007). Then, a thumbnail image is formed by the thumbnailing section 202 (S1008), and the resultant thumbnail image is set in the thumbnail file 214 (S1009). The processing for MM data registration is thus ended (S1010).

Figure 12:
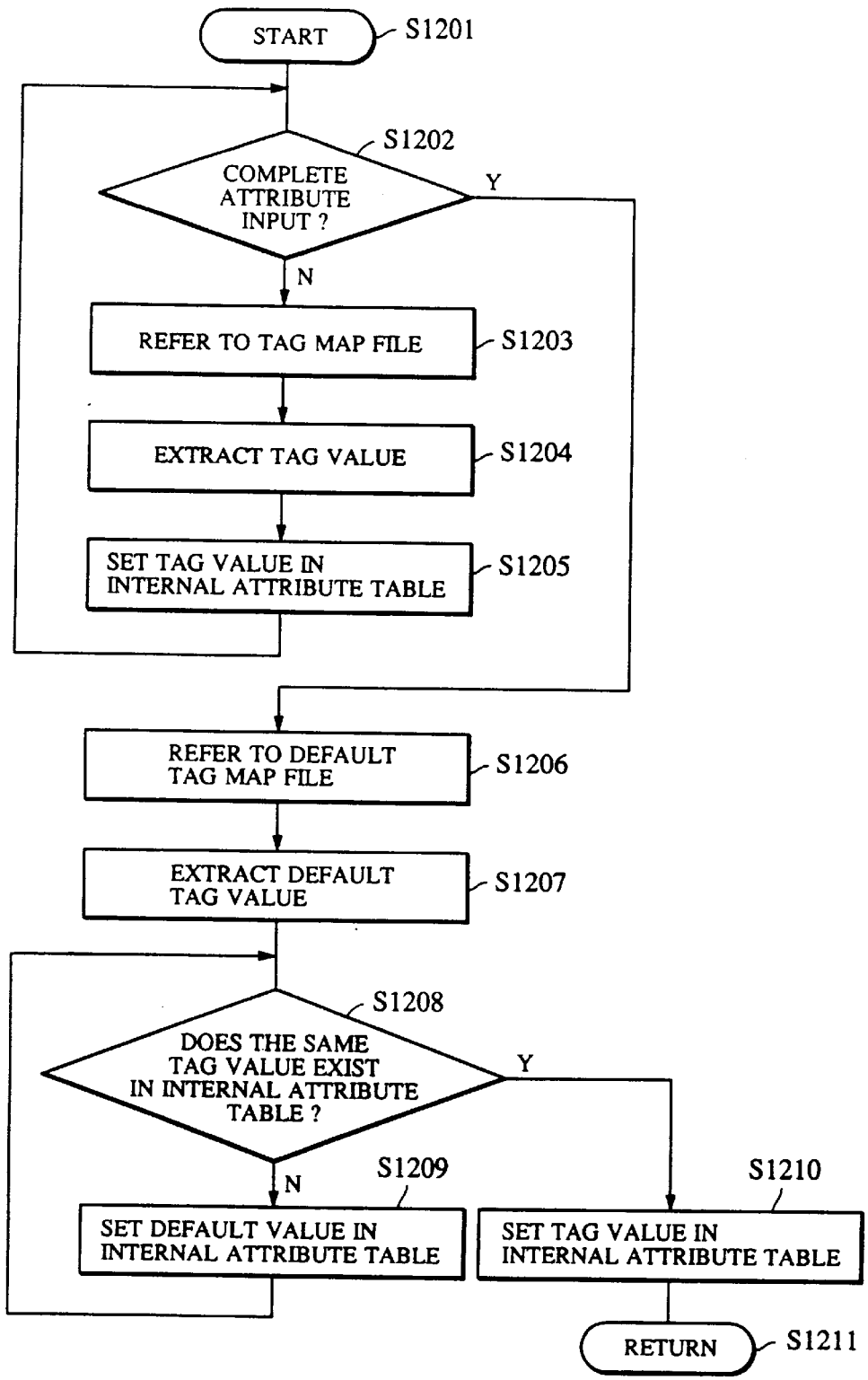
FIG. 12 is a flow chart illustrative of a subroutine for the attribute input and the extraction of the tag value according to the second embodiment of the present invention.

FIG. 12 is a flow chart illustrative of the processing of the attribute input and the extraction of the tag value executed in S1003 of FIG. 11. The flow starts in S1201, and it is determined whether the attribute input has been completed (S1202). If the answer in S1202 is NO, the flow proceeds to S1203 in which a reference is made to the tagged map file shown in FIG. 10(b). Then, the tag value is extracted (S1204) and is set in an internal attribute table stored in the memory (which table is a temporary table and is used until the content of the attribute file is decided) (S1205). This procedure is repeated until the attribute input is completed.

On the other hand, if the answer in S1202 is YES, that is, the attribute input has been completed, the flow proceeds to S1206 in which a reference is made to the default tagged map file. Then, a default tag value is extracted (S1207), and it is determined whether the same tag value is contained in the internal attribute table in the memory (S1208). If the answer in S1208 is NO, the default value is set in the internal attribute table (S1209). If the answer is YES, the determined tag value is set in the internal attribute table (S1210). The processing of the attribute input and the extraction of the tag value is thus ended (S1211).

Figure 13:
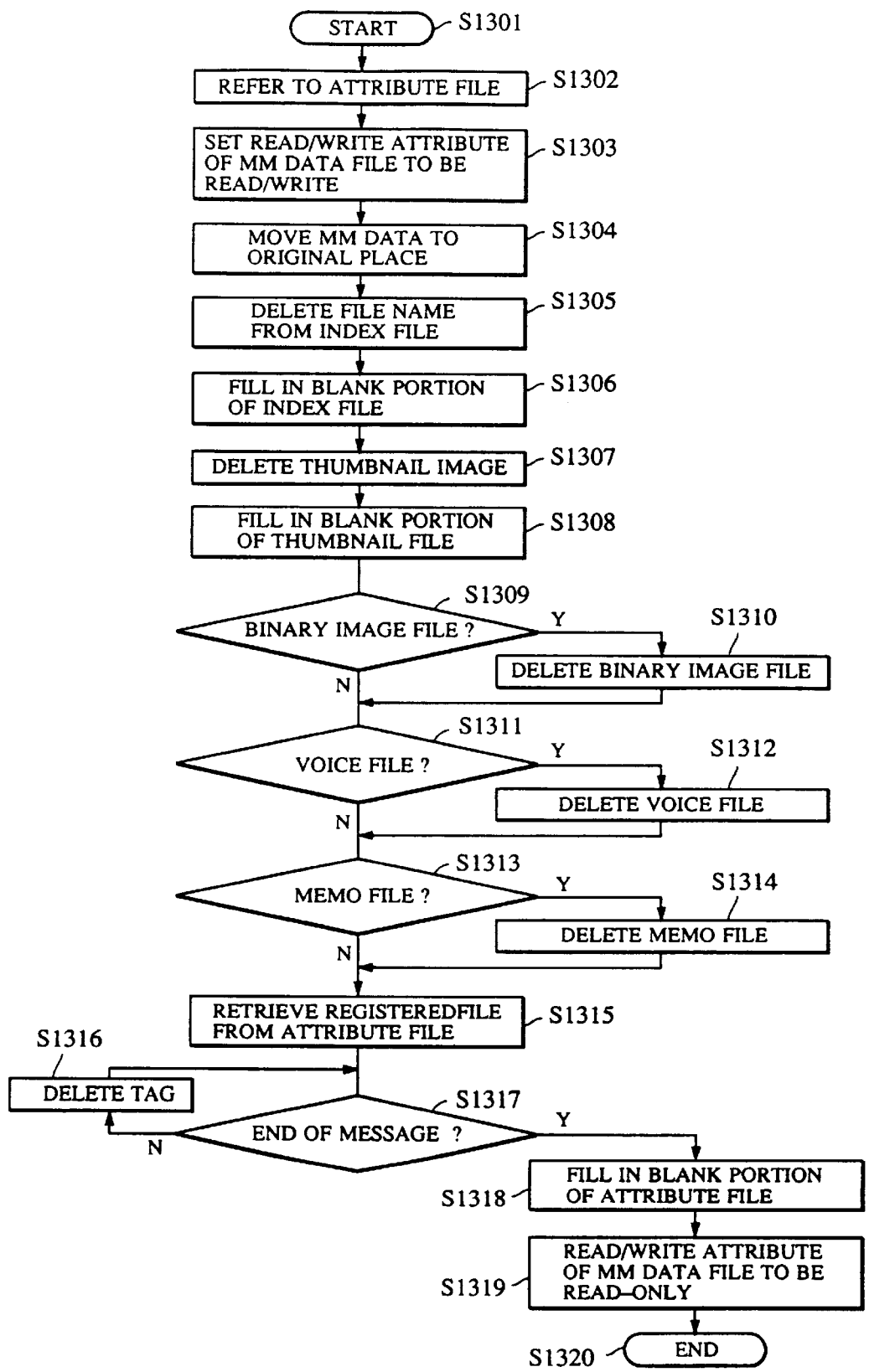
FIG. 13 is a flow chart illustrative of the MM data deletion according to the second embodiment of the present invention.

FIG. 13 is a flow chart illustrative of the deletion of the MM data. The flow starts in S1301. A reference is made to the attribute file (S1302), and the read/write attribute peculiar to the MM data file is set to be read/write so that the file can be read and written (S1303).

Then, the MM data is moved back to the original place where it has been stored in the file of the OS (S1304). The designated file name is deleted from the index file 216 (S1305), and a blank of the index file 216 is deleted (S1306).

A thumbnail image is deleted from the thumbnail file (S1307), and a blank of the thumbnail file is deleted (S1308).

It is determined whether a binary image file is contained in the targeted MM data (S1309). If the answer in S1309 is YES, the flow proceeds to S1310, in which the binary image file is deleted. If the answer in S1309 is NO, the flow proceeds to S1311 in which it is determined whether a voice file is contained in the targeted MM data. If the answer in S1311 is YES, the flow proceeds to S1312, in which the voice file is deleted. If the answer is NO, the flow proceeds to S1313.

In S1313, it is determined whether a memo file is contained in the targeted MM data. If the answer in S1313 is YES, the flow proceeds to S1314, in which the memo file is deleted. If the answer is NO, the flow proceeds to S1315.

In S1315, the registered file name is retrieved from the attribute file 215, and the tags below such a retrieved file name are deleted (S1316). Subsequently, it is determined whether the end of message (EOM) is reached (S1317). If the answer in S1317 is NO, the flow returns to S1316, in which the tag deletion is again executed (S1316). This procedure is repeated until the EOM is indicated.

When the EOM is reached in S1317, a blank of the attribute file is deleted (S1318). Then, the read/write attribute of the MM data is set to be read-only (S1319). The processing peculiar to the MM data deletion is thus ended (S1320).

According to the foregoing procedure, the MM data file has thus been deleted under the control of the currently-activated application. It can be now activated under OS control so that it can be accessed by the OS and other applications. Further, a new directory in which the file name is stored might not be provided for the OS, thereby enabling the file to be hidden to the user.

As will be clearly understood from the foregoing description, the second embodiment offers the following advantages.

A file can be controlled through an application in a unified manner and can be accessed only through such an application, thereby protecting such a file from being accidentally erased by user access through another application or through the OS.

The attribute file (table) is utilized to record the history and the registration place of a data file, thus enabling the restoration of the data file to the OS and also simplifying the user manipulation associated with such restoration of the file, free from inconvenience for the user.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A data management apparatus for managing a plurality of data including images, voice, characters, said apparatus comprising:
   a) attribute file formation means for forming an attribute file for registering therein an attribute peculiar to data to be registered;
   b) data registration means for registering an attribute peculiar to the data into said attribute file, simultaneously with the registration of the data;
   c) data processing means for processing and managing the data through a predetermined application in a unified manner based on attribute data registered in said attribute file; and
   d) attribute setting means for protecting the attribute data stored in said attribute file from being rewritten in response to the processing for ending an operation of the application.

2. A data management apparatus according to claim 1, wherein said attribute setting means sets the attribute data in said attribute file to be one of the modes of "read-only" and "hidden" before the processing of the application is ended.

3. A data management apparatus according to claim 1, wherein said data processing means is able to shift the data to be usable under the management of the application from under the management of an operating system (OS) which supports the application and is also able to shift the data to be usable under the management of said OS from under the management of the application, through the control of said data registration means on said attribute data in said attribute file.

4. A data management apparatus according to claim 3, wherein the data is multimedia data including image, voice, and the like.

5. A data management apparatus according to claim 1, wherein said data registration means further comprises: attribute formation means for forming an attribute by reading a path in which the data file to be registered is stored, said path indicating where the file is stored in a tree structure, so as to register the attribute in said attribute file; and index extraction means for extracting a name of said path, a file name on said operating system (OS) which supports the application, and a data file name managed by said management apparatus so as to store them as indexes in an index file.

6. A data management apparatus according to claim 5, further comprising:
   data erase means for retrieving the path name and the file name from said attribute file before the registered data file is deleted so as to restore the data file as the file name to the place in which the path name has been stored;
   index erase means for deleting the same file name as the data file to be deleted, from said index file; and
   attribute erase means for deleting the attribute data obtained when the data file is registered, from said attribute file.

7. A data management apparatus for managing a plurality of data including images, voice, characters, in a unified manner, said apparatus comprising:
   a) data registration means for forming an attribute file for registering therein an attribute peculiar to data to be registered so as to register the attribute data in peculiar to the data in said attribute file, simultaneously with the registration of the data;
   b) data management means for processing and managing the attribute data registered by said data registration means through application in a unified manner;
   c) data erase means for deleting the data by use of said attribute file and for shifting the to be operable under the management of an operating system said data management apparatus; and
   d) attribute setting means for setting the attribute stored in said attribute file to be the mode of "read-only" or "hidden" in response to the processing for ending an operation of the application.

8. A data management apparatus according to claim 7, wherein said attribute setting means sets the attribute registered in said attribute file to be the modes of "read-only" and "hidden" after completing the registration of the data by said data registration means, thereby protecting the data from being erased.

9. A data management apparatus according to claim 7, wherein said data erase means deletes the attribute data registered in said attribute file, thereby shifting the data to be usable under the management of an operating system (OS) which supports the application from under the management of the application.

10. A data management apparatus according to claim 7, wherein said data registration means further comprises: attribute formation means for forming the attribute by reading a path in which the data file to be registered is stored, said path indicating where the file is stored in the tree structure, thereby registering the attribute in one of said attribute file; and index extraction means for extracting a name of said path, a file name on an operating system which supports the application, and a data file name managed by said data management apparatus so as to store them as indexes in an index; and wherein said data erase means retrieves the path name and the file name from said attribute file and before the registered data file is deleted so as to restore the file as the file name to the place in which the path name has been stored, said data erase means comprising: index erase means for deleting the same file name as the data file to be deleted, from said index file; and attribute erase means for deleting the attribute data obtained when the data file is registered, from said attribute file and said attribute table.

11. A data management apparatus according to claim 10, wherein the data is multimedia data including images, voice, characters, and the like.

12. A method for managing a plurality of data including images, voice, characters, in a unified manner, said method comprising the steps of:

registering an attribute peculiar to the data in an attribute file, concurrently with the registration of the data;

allowing the data to be processed and managed through an application in a unified manner based on the attribute data stored in the attribute file; and setting the attribute data to be the mode of "read-only" or "hidden" in response to completion of the processing for ending an operation of the application, thereby protecting the data from being accessed by an operating system and applications other than the application.

13. A method for managing data according to claim 12, wherein the attribute is formed by reading a path in which the data file to be registered is stored, the path indicating where the file is stored in the tree structure, simultaneously with the registration of the data, thereby registering the attribute in the attribute file; and wherein the path name, a file name on the operating system (OS) which supports the application, and a data file name managed by a management apparatus are extracted and stored as indexes in an index file.

14. A method for managing data according to claim 13, wherein the path name and the file name are retrieved from the attribute file before the registered data file is deleted so as to allow the data to be restored as the file name in the place in which the path name has been stored; and wherein the same file name as the data file to be deleted is deleted from the index file, and the attribute data obtained when the data file is registered is deleted from the attribute file.

15. A method for managing a plurality of data including images, voice, characters, or the in a unified manner, said method comprising the steps of:

a) registering an attribute peculiar to the data in an attribute file, concurrently with the registration of the data;

b) allowing the data to be processed and managed through an application in a unified manner based on the attribute data stored in the attribute file;

c) deleting the data by use of one of the attribute file and attribute table, and shifting the data to be usable under the management of an operating system (OS), thereby erasing the data; and d) setting the attribute data in one of the attribute file the attribute table to be the mode of "read-only" or "hidden" in response to the processing for ending the application, by protecting the data from being accessed by the operating system and applications other than the application.

16. A method according to claim 15, further comprising the steps of:

forming the attribute by reading a path in which the data file to be registered is stored, the path indicating where the file is stored in the tree structure, so as to register the attribute in the attribute file, simultaneously with the registration of the data;

extracting a name of the path and a file name of the operating system which supports the application, and a data file name managed by a data management apparatus, thereby storing them as indexes into an index file;

retrieving the path name and the file name from the attribute file so as to restore the data file as the file name in the place in which the path name has been stored;

deleting the same file name as the data file to be deleted, from the index file; and deleting the attribute data obtained when the data file is registered from the attribute file.

17. A data management system for managing a plurality of data including image data, said apparatus comprising:

a) attribute file formation means for forming an attribute file for registering therein an attribute peculiar to data to be registered;

b) data registration means for registering an attribute peculiar to the data into said attribute file, simultaneously with the registration of the data;

c) data processing means for processing and managing the data through a predetermined application in a unified manner based on attribute data registered in said attribute file; and d) attribute setting means for setting the attribute data registered in said attribute file so as to inhibit the data from being rewritten in response to the processing for ending an operation of the application.

18. A data management system according to claim 17, wherein said attribute setting means sets the attribute data in said attribute file to be the mode of "read-only" or "hidden" before the processing of the application is ended.

19. A data management apparatus according to claim 17, wherein said data processing means is able to shift the data to be usable under the management of the application from under the management of an operating system which supports the application and is able to shift the data to be usable under the management of said operating system from under the management of the application, through the control of said data registration means on said attribute data in said attribute file.

20. A data management system according to claim 17, wherein said data registration means further comprises:

attribute formation means for forming an attribute by reading a path in which the data file to be registered is stored, said path indicating where the file is stored in a tree structure, so as register the attribute in said attribute file; and index extraction means for extracting a name of said path, a file name on said operating system which supports the application, and a data file name managed by said management apparatus so as to store them as indexes in an index file.

21. A data management system according to claim 20, further comprising:

data erase means for retrieving the path name and the file from said attribute file before the registered data file is deleted so as to restore the data file as the file name to the place in which the path name has stored;

index erase means for deleting the same file name as the data file to be deleted, from said index file; and attribute erase means for deleting the attribute data obtained when the data file is registered, from said attribute file.

22. A data management system for managing data in a unified manner, said apparatus comprising:

a) data registration means for forming an attribute file for registering therein an attribute peculiar to data in said attribute file, simultaneously with the registration of the data;

b) data management means for processing and managing the attribute data registered by said data registration means through application in a unified manner;

c) data erase means for deleting the data by use of said attribute file and for shifting the data to be operable under the management of an operating system said data management apparatus; and d) attribute setting means for setting the attribute registered in said attribute file to be the mode of "read-only" or "hidden" in response to the processing for ending an operation of the application.

23. A data management system according to claim 22, wherein said attribute setting means sets the attribute registered in said attribute file to be the mode of "read-only" or "hidden" after completing the registration of the data by said data registration means, thereby protecting the data from being erased.

24. A data management system according to claim 22, wherein said data erase means deletes the attribute data registered in said attribute file, thereby shifting data to be usable under the management of an operating system which supports the application from under the management of application.

25. A data management system according to claim 22, wherein said data registration means further comprises:

attribute formation means for forming the attribute by reading a path in which the data file to be registered is stored, said path indicating where the file is stored in the tree structure, thereby registering the attribute in one of said attribute file; and index extraction means for extracting a name of said path, a file name on an operating system which supports the application, and a data file name managed by said data management apparatus so as to store them as indexes in an index; and wherein said data erase means retrieves the path name and the file name from said attribute file and before the registered data file is deleted so as to restore the file as the file name to the place in which the path name has been stored, said data erase means comprising:

index erase means for deleting the same file name as the data file to be deleted, from said index file; and attribute erase means for deleting the attribute data obtained when the data file is registered, from said attribute file and said attribute table.

26. A method for managing data in a unified manner, said method comprising the steps of:

registering an attribute peculiar to the data in an attribute file concurrently with the registration of the data;

allowing the data to be processed and managed through an application in a unified manner based on the attribute data stored in the attribute file; and setting the attribute data to be the mode of "read-only" or "hidden" in response to completion of the processing for ending an operation of the application, thereby protecting the data from being accessed by an operating system and applications other than the application.

27. A method for managing data according to claim 26, wherein the attribute is formed by reading a path in which the data file to be registered is stored, the path indicating where the file is stored in the tree structure, simultaneously with the registration of the data, thereby registering the attribute in the attribute file; and wherein the path name, a file name on the operating system which supports the application, and a data file name managed management apparatus are extracted and stored as indexes in an index file.

28. A method for managing data according to claim 27, wherein the path name and the file name are retrieved from the attribute file before the registered data is deleted so as to allow the data to be restored as the file in the place in which the path name has been stored; and wherein the same file name as the data file to be deleted is deleted from the index file, and the attribute data obtained when the data file is registered is deleted from the attribute file.

* * * * *

UNITED STATES PATENT AND TRADEMARK OFFICE
CERTIFICATE OF CORRECTION

PATENT NO.   :   6,018,744
DATED        :   January 25, 2000
INVENTOR(S)  :   AKIRA MAMIYA ET AL.                    Page 1 of 2

It is certified that error appears in the above-identified patent and that said Letters Patent is hereby corrected as shown below:

ON COVER PAGE AT [54], TITLE

"DATA MANAGEMENT METHOD AND APPARATUS FOR SUCH DATA MANAGEMENT" should read --UNIFIED DATA MANAGEMENT CAPABLE OF MANAGING DATA INCLUDING IMAGES, VOICE, CHARACTERS, ETC.--.

ON COVER PAGE AT [56] REFERENCES CITED, U.S. PATENT DOCUMENTS

"5,421,012   8/1987   Khoyi et al." should read
--5,421,012   5/1995   Khoyi et al.--.

SHEET 3

FIG. 3, In 306, "APPLICATTON FILE" should read --APPLICATION FILE--.

COLUMN 1

Line 1, "DATA MANAGEMENT METHOD AND APPARATUS FOR SUCH DATA MANAGEMENT" should read --UNIFIED DATA MANAGEMENT CAPABLE OF MANAGING DATA INCLUDING IMAGES, VOICE, CHARACTERS, ETC.--.

COLUMN 8

Line 14, "(51002)." should read --(S1002).--.

COLUMN 9

Lin 53, "voice, characters," should read --voice, and characters, in a unified manner,--.

UNITED STATES PATENT AND TRADEMARK OFFICE
CERTIFICATE OF CORRECTION

PATENT NO. : 6,018,744

DATED : January 25, 2000

INVENTOR(S) : AKIRA MAMIYA ET AL.

It is certified that error appears in the above-identified patent and that said Letters Patent is hereby corrected as shown below:

COLUMN 10

Line 43, "voice," should read --voice, and--;
    Line 47, "in peculiar" should read --peculiar--;
    Line 55, "shifting the to" should read --shifting the data to--;
    Line 56, "system" should read --system for--.

COLUMN 11

Line 31, "voice," should read --voice, and--;
    Line 63, "voice," should read --voice, and--.

Signed and Sealed this

Twenty-second Day of May, 2001

Attest:

NICHOLAS P. GODICI

Attesting Officer    Acting Director of the United States Patent and Trademark Office